United States Patent [19]

Ziegenfus et al.

[11] 4,077,327

[45] Mar. 7, 1978

[54] TURNTABLE WITH A VEHICLE ROTARY DRIVE SHAFT AND EXTERNAL TRANSMISSION MEANS

[75] Inventors: Barry L. Ziegenfus, Saylorsburg; Richard Jocsak, Easton, both of Pa.

[73] Assignee: SI Handling Systems, Inc., Easton, Pa.

[21] Appl. No.: 718,653

[22] Filed: Aug. 26, 1976

[51] Int. Cl.² .................. B60S 13/02; B61B 13/00; F16H 7/02
[52] U.S. Cl. .......................... 104/35; 74/228; 104/166
[58] Field of Search .............. 104/35, 39, 46, 166, 104/36, 37, 38; 74/63, 69, 82, 226, 506, 827

[56] References Cited

U.S. PATENT DOCUMENTS

| 129,327 | 7/1872 | Fenno | 74/228 |
| 423,872 | 3/1890 | Judson | 104/166 |
| 2,765,666 | 10/1956 | Haug | 74/228 |
| 2,815,050 | 12/1957 | Haug | 74/228 |
| 3,164,104 | 1/1965 | Hunt | 104/166 |
| 3,898,935 | 8/1975 | Norlie et al. | 104/37 |

Primary Examiner—Evon C. Blunk
Assistant Examiner—Carl Rowold
Attorney, Agent, or Firm—Seidel, Gonda & Goldhammer

[57] ABSTRACT

A vehicle turntable having a set of tracks and a drive tube are mounted for rotation about a vertical axis. A belt and pulley arrangement is provided for rotating the drive tube about its longitudinal axis in all rotative positions of the turntable while using rotation of an adjacent drive tube thereby eliminating the need for a separate independent motor on the turntable.

11 Claims, 3 Drawing Figures

TURNTABLE WITH A VEHICLE ROTARY DRIVE SHAFT AND EXTERNAL TRANSMISSION MEANS

BACKGROUND

This invention relates generally to vehicle turntables, and in particular, turntables for accomodating driverless vehicles of the type classifiable in class 104, subclass 166. For relevant prior art vehicles, see U.S. Pat. Nos. 3,356,040 and 3,818,837.

This invention is an improvement over a turntable such as that disclosed in co-pending application Ser. No. 607,164 filed on Oct. 25, 1975 by Vercoe C. Jones. Each turntable disclosed in said application of Vercoe C. Jones includes a separate drive motor for rotating the drive tube on each turntable. The provision of a drive motor on the turntable for driving the drive tube increases the cost, increases the weight to be rotated, and has further complications in the need for brushes and contacts for coupling of electricity to the motor in all rotative positions of the turntable. The present invention eliminates the need for a separate drive motor on the turntable.

SUMMARY OF THE INVENTION

The apparatus of the present invention is directed to a turntable having thereon a spaced set of tracks and a rotatable drive tube disposed between said tracks. A support structure is provided for supporting the table for rotative movement about an axis which is perpendicular to the longitudinal axis of said drive tube. A power means is connected to said turntable for selectively causing such movement.

The apparatus includes a main pulley concentric with said axis. Idler pulleys are provided on the turntable. An endless belt extends around the turntable drive tube, the idler pulleys and the main pulley. Hence, as the main pulley is rotated, the drive tube is rotated about its longitudinal axis. A means is connected to the main pulley and an adjacent drive tube for converting rotary motion of the last-mentioned drive tube into a motive force for rotating the main pulley.

It is an object of the present invention to provide a vehicle turntable which has a drive tube thereon but without a separate drive motor for said tube.

It is another object of the present invention to provide a vehicle turntable which is lighter in weight, simpler and less expensive than those proposed heretofore.

It is another object of the present invention to provide a mechanical drive for rotating a drive tube on a turntable while using rotary movement of an adjacent drive tube.

Other objects will appear hereinafter.

For the purpose of illustrating the invention, there is shown in the drawings a form which is presently preferred; it being understood, however, that this invention is not limited to the precise arrangements and instrumentalities shown.

Referring to the drawing in detail, wherein like numerals indicate like elements, there is illustrated a track system designated generally as 10 and which includes a turntable designated generally as 12.

Figure 1:
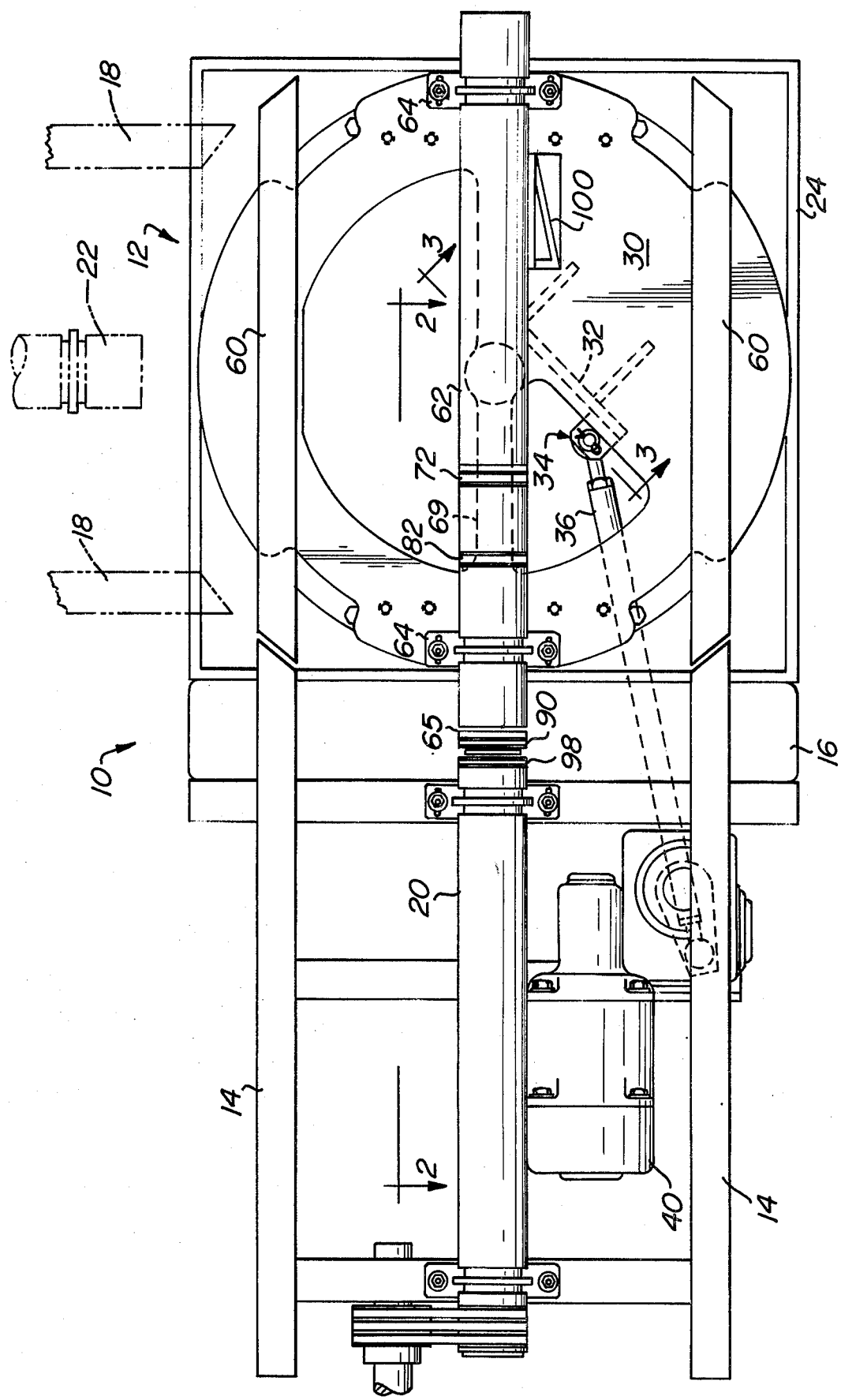
FIG. 1 is a top plan view of a track system incorporating a turntable of the present invention.

The track system 10 includes a first set of stationary tracks 14 mounted on a stationary support 16. A second set of tracks 18 is provided adjacent the turntable 12. The turntable 12 is utilized to transfer driverless vehicles from the tracks 14 to the tracks 18.

A first drive tube 20 is provided between and parallel to the tracks 14. A conventional motor is coupled to the tube 20 for rotating the tube 20 about its longitudinal axis. A second drive tube 22 is provided between and parallel to the tracks 18. The drive tubes 20 and 22 constitute the means for propelling the driverless vehicles along their respective tracks in the manner as described in the above-mentioned patents.

The turntable 12 includes a base 24 on which is mounted a stationary support structure 26. A top plate 30 of generally circular configuration is rotatably supported by structure 26 as a result of cooperating bearings 28 disposed therebetween. See FIG. 2. The diameter of the bearings 28 is substantially as large as the diameter of the plate 30.

A bracket 32 is secured to the lower surface of plate 30 and depends therefrom. Suitable reinforcement ribs are provided between bracket 32 and plate 30 whereby the bracket 32 is rigid. Bracket 32 lies along a chord of the top plate 30.

A pin assembly 34 is secured to the bracket 32. See FIGS. 2 and 3. A connecting rod 36 has one end pivotably connected to the assembly 34. The other end of the connecting rod 36 is pivotably connected to one end of an arm 38. See FIG. 2. Arm 38 is driven by a single revolution motor and gear box 40. It will be noted that the motor and gear box 40 are supported exterior of the turntable 12 on a stationary portion of the support for tracks 14.

Figure 3:
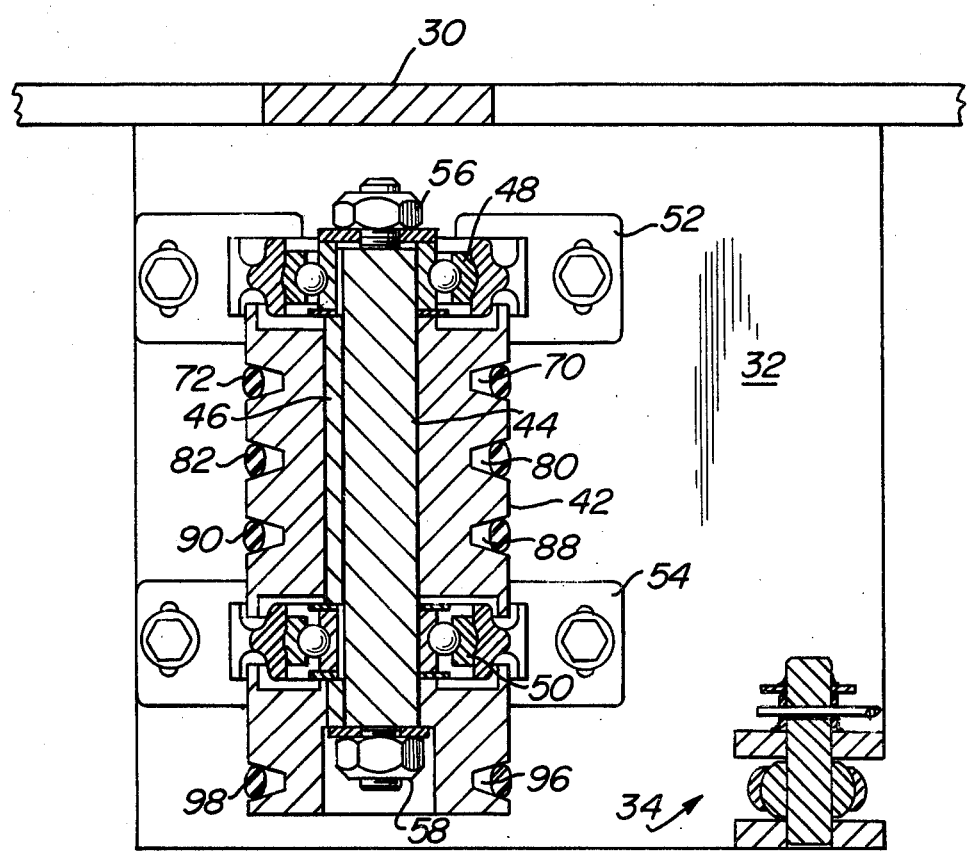
FIG. 3 is a sectional view taken along the line 3—3 in FIG. 1.

Referring particularly to FIG. 3, a main drive pulley 42 is supported by the bracket 32 for rotation about a vertical axis coinciding with with the geometric center of the top plate 30. The main drive pulley 42 is connected to a shaft 44 by way of a key 46. Shaft 44 is supported at its upper end by bearings 48 and at its lower end by bearings 50. Bearing 48 is part of a pillow block 52 adjustably bolted to the bracket 32. Bearing 50 is part of a pillow block 54 adjustably bolted to the bracket 32. A washer and a nut 56 is attached to the upper end of shaft 44 to retain the bearing 48. A washer and a nut 58 are attached to the lower end of shaft 44 to retain the shaft 44 against a shoulder on the ID of the main pulley 42.

A third set of tracks 60 are provided on the top plate 32 and fixedly secured thereto. The tracks 60 are selectively alignable with the tracks 14 and 18. A third drive tube 62 is provided on the top plate 32 and supported thereon by pillow blocks 64 adjacent the ends of tube 62. The pillow blocks 64 support tube 62 for rotation about its longitudinal axis. The longitudinal axes of the drive tubes 20, 22 and 62 lie in the same plane. Hence, in the position of the turntable 12 as shown in FIG. 1, the drive tubes 20 and 62 are coaxial with their adjacent ends spaced from one another by the gap 65.

Figure 2:
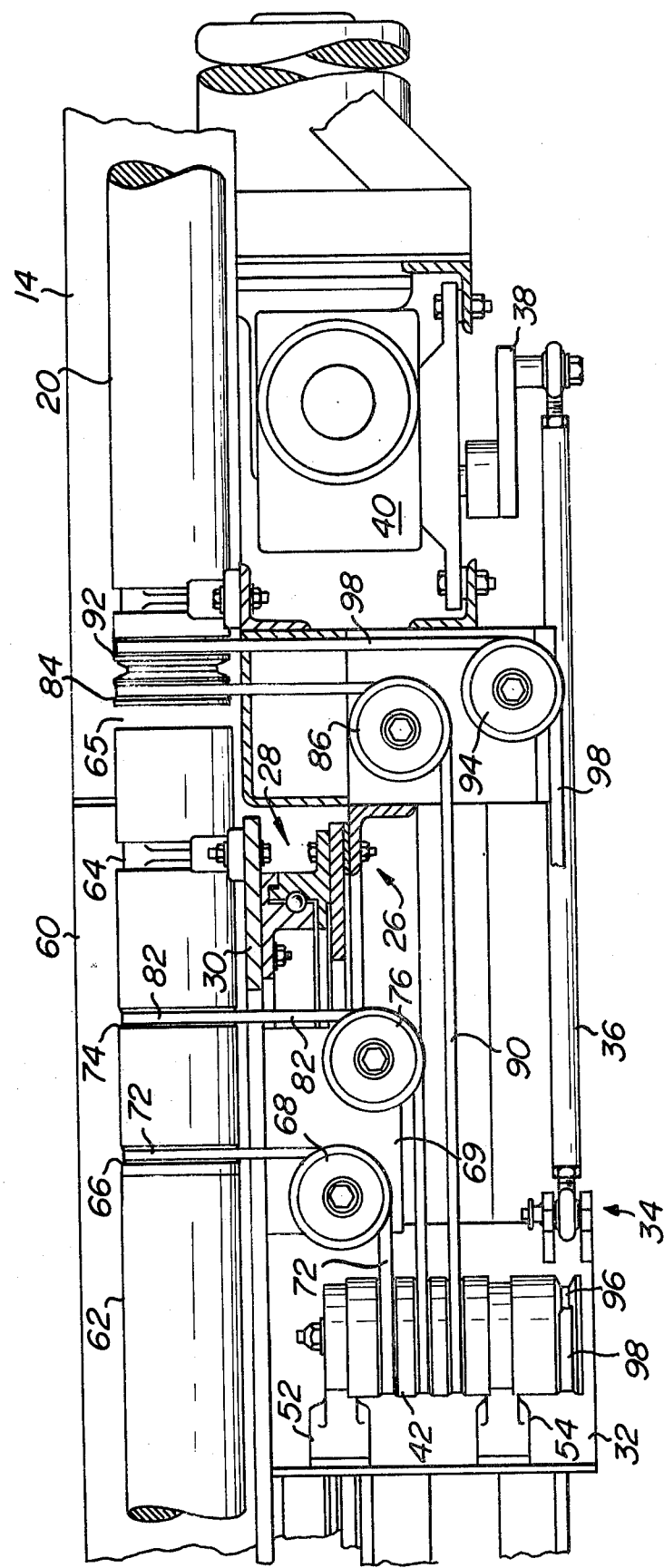
FIG. 2 is a sectional view taken along the line 2—2 in FIG. 1.

Referring to FIG. 2, the drive tube 62 is slightly below the elevation of the tracks 14 and 60. A groove 66 is provided on the drive tube 62. Idler wheels 68 are rotatably supported for rotation about horizontal axes on opposite sides of the tube 62. The main drive pulley 42 is provided with circumferential groove 70. An endless flexible member such as belt 72 is disposed in the grooves 66 and 70 and extends around the idler rollers 68.

The grooves 66 and 70 are so positioned so that the belt 72 will be tangent to the idler pulleys 68. Belt 72 may be made from any conventional friction drive belt material. Belt 72 is preferably applied as a strip of finite length. Thereafter, the ends of the belt 72 are secured together mechanically or secured together by welding.

Thus, as the main drive pulley 42 rotates about a vertical axis, such motion is transmitted by way of belt 72 to cause the drive tube 62 to rotate about its horizontally disposed longitudinal axis. I prefer to use a narrow belt 72, such as ¼ inch to ⅜ inch wide belt. Thus, I prefer to provide a second belt extending between the main drive pulley 42 and the drive tube 62. In that regard, the drive tube 62 as illustrated includes a second groove 74. A pair of idler pulleys 76 are supported on opposite sides of the tube 62. The pulleys 68, 76 are supported below plate 30 by a depending radially disposed bracket 69.

The idler pulleys 76 rotate about an axis which is at an elevation below the elevation of the axis of idler pulley 68. The main pulley 42 is provided with a groove 80. A second drive belt 82 is provided. Belt 82 is disposed in the grooves 74 and 80 and extends around the idler pulleys 76. Belt 80 is of the same material and installed in the manner as belt 72.

The main drive pulley 42 is driven by the first drive tube 20. As shown in FIG. 2, a groove 84 is provided on tube 20 adjacent the gap 65. A groove 88 is provided on the main drive pulley 42 below the elevation of the groove 80. A set of idler pulleys 86 are supported by the stationary support structure 26 at an elevation below the elevation of the axis of rotation of idler pulleys 76. A drive belt 90 is disposed in grooves 84 and 88 and extends around the idler pulleys 86.

A second groove 92 is provided on the drive tube 20 adjacent the groove 84. Idler pulleys 94 are supported at an elevation below the elevation of the idler pulleys 86. The main drive pulley 42 is provided with a groove 96. A drive belt 98 is disposed in the grooves 92, 96 and extends around the idler pulleys 94.

A stop assembly is provided between the tracks 14, but not shown, for stopping vehicles in the event that the drive tube 62 is not aligned with the drive tube 20. Also, a stop assembly 100 is provided on the turntable 12 for stopping vehicles in a position after they have been transferred to the turntable 12. The stop assembly 100 includes a microswitch which is tripped by a vehicle for initiating operation of the motor 40. The stop assemblies referred to above are per se conventional and may be of the type disclosed in the above-mentioned pending application of Vercoe C. Jones.

In view of the above description and accompanying drawings, detailed explanation of operation is not deemed necessary. By way of the drive belts 90, 98, rotary motion of the drive tube 20 drives the main pulley 42 about its longitudinal axis. By way of the drive belts 72, 82, the main pulley 42 rotatably drives the tube 62 about its longitudinal axis in all rotary positions of the turntable 12. The means for driving tube 20 is simple, inexpensive, and reliable. The thusly described means for driving tube 20 eliminates the weight and cost of a drive motor on the turntable 12, the components necessary for coupling electrical power to such a motor including brushes and the like, reduces the mass of the turntable 12 which must be rotated, etc.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for conveying vehicles comprising a turntable having a spaced set of tracks for supporting said vehicles and a rotatable drive tube for driving a drive means on said vehicles, said drive tube being disposed between said tracks, support structure supporting said table for movement about an axis perpendicular to the longitudinal axis of said tube, power means connected to said table for selectively causing such movement of the table, a main drive member concentric with the axis of movement of said table and below said table, at least one flexible member extending radially outwardly from said main drive member and then upwardly to said drive tube so that said main drive member may cause said tube to rotate about its longitudinal axis in all rotative positions of said turntable, and means drivingly coupled to said main drive member for rotating said main drive member about said axis.

2. Apparatus in accordance with claim 1 wherein said main drive member is a pulley, a bracket on said turntable and having an upright surface supporting said pulley, a pin assembly supported by said surface, said power means including a connecting rod having one end pivotably connected to said pin assembly and a motor means connected to the other end of said rod for moving the rod to cause such rotative movement of said turntable.

3. Apparatus in accordance with claim 1 wherein said main drive member is a multi-groove pulley connected to said drive tube by a pair of flexible drive belts, each drive belt extending around a discrete pair of idler pulleys, one pair of idler pulleys being at an elevation different from the elevation of the other pair of idler pulleys, said pairs of idler pulleys being supported by said turntable for movement therewith.

4. Apparatus in accordance with claim 3 wherein said means for rotating said drive member includes a rotating tube separate from said turntable and a flexible drive belt drivingly coupling said last mentioned tube to said multi-groove pulley.

5. Apparatus for conveying vehicles comprising a turntable having a spaced set of tracks for supporting said vehicles and a rotatable drive tube for driving a drive means on said vehicles, said drive tube being disposed between said tracks, support structure supporting said table for oscillation about an axis perpendicular to the longitudinal axis of said tube, power means connected to said table for selectively causing such movement of the table, a main pulley below said turntable and concentric with the axis of oscillation of said table, spaced idler pulleys on and below the elevation of said turntable, said tube having a peripheral circumferential groove, a portion of an endless belt being disposed in said groove, said belt having a discrete portion engaging each of said idler pulleys, said belt having a portion disposed around said main pulley, said idler pulleys being disposed radially outwardly of said axis but closer to said axis than said groove on said drive tube, whereby rotation of said main pulley causes said belt to rotate said tube about its longitudinal axis.

6. In a track system having first and second sets of tracks separated by a turntable for transferring vehicles from the first set of tracks to the second set of tracks, a discrete drive tube associated with each of said first and second sets of tracks, said turntable having a spaced set of tracks and a rotatable drive tube therebetween, power means connected to said turntable for selectively rotating said turntable about a vertical axis to alternately place the turntable drive tube in alignment with the first and second drive tubes, a main pulley concentric with said axis, means including at least one belt extending from said main pulley to the turntable drive tube for rotatably driving said turntable drive tube about its longitudinal axis, and means coupled to each of said main pulley and said first drive tube for converting rotary motion of said first drive tube to rotary motion of said main pulley in all operative rotary positions of said turntable, whereby said first drive tube is the power source for rotating said turntable drive tube.

7. In a system in accordance with claim 6 wherein said last-mentioned means includes a drive belt extending downwardly from said first drive tube around idler pulleys and then radially inwardly to said main pulley.

8. In a track system in accordance with claim 7 wherein a pair of drive belts extend downwardly said turntable drive tube and and then radially inwardly to said main pulley.

9. In a track system in accordance with claim 6 wherein said main pulley is supported by a depending bracket on said turntable and said turntable being rotatably supported by support structure at a location adjacent the outer periphery of said turntable.

10. In a track system in accordance with claim 8 wherein said power means includes a connecting rod and motor for rotating said table 90 degrees, and said first and second tracks being perpendicular to each other.

11. In a track system in accordance with claim 6 wherein said turntable is supported by bearings adjacent its periphery, and said main pulley being supported by a depending bracket on the turntable.

* * * * *